(12) United States Patent
Myokan et al.

(10) Patent No.: US 7,027,259 B2
(45) Date of Patent: Apr. 11, 2006

(54) DISK UNIT WITH INCREASED HEAD-POSITIONING ACCURACY

(75) Inventors: Kenichi Myokan, Kawasaki (JP); Takeo Hayashi, Kawasaki (JP); Tatsuya Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 09/911,321

(22) Filed: Jul. 23, 2001

(65) Prior Publication Data

US 2002/0071202 A1 Jun. 13, 2002

(30) Foreign Application Priority Data

Dec. 11, 2000 (JP) .............................. 2000-376542

(51) Int. Cl.
*G11B 33/14* (2006.01)

(52) U.S. Cl. .................................................. 360/97.02

(58) Field of Classification Search ............. 360/97.02, 360/264.1, 264, 264.4, 264.7, 97.03
See application file for complete search history.

(56) References Cited

U.S. PATENT DOCUMENTS

| | | | | |
|---|---|---|---|---|
| 4,703,379 A | * | 10/1987 | Bogdanski | 360/118 |
| 4,821,130 A | * | 4/1989 | Bernett et al. | 360/78.04 |
| 4,879,618 A | * | 11/1989 | Iida et al. | 360/264.1 |
| 4,885,652 A | * | 12/1989 | Leonard et al. | 360/133 |
| 5,025,337 A | * | 6/1991 | Brooks | 360/97.03 |
| 5,134,530 A | * | 7/1992 | Hall | 360/97.03 |
| 5,307,222 A | * | 4/1994 | Dion | 360/97.02 |
| 5,517,372 A | * | 5/1996 | Shibuya et al. | 360/97.02 |
| 5,636,082 A | * | 6/1997 | Shibuya et al. | 360/97.02 |
| 5,696,649 A | * | 12/1997 | Boutaghou | 360/97.03 |
| 5,801,899 A | * | 9/1998 | Genheimer | 360/97.01 |
| 5,854,725 A | * | 12/1998 | Lee | 360/266 |
| 5,907,453 A | * | 5/1999 | Wood et al. | 360/97.02 |
| 6,097,568 A | * | 8/2000 | Ekhoff | 360/97.02 |
| 6,163,433 A | * | 12/2000 | Misso | 360/256.1 |
| 6,208,484 B1 | * | 3/2001 | Voights | 360/97.02 |
| 6,266,208 B1 | * | 7/2001 | Voights | 360/97.02 |
| 6,362,937 B1 | * | 3/2002 | Gibbs et al. | 360/256.1 |
| 6,369,978 B1 | * | 4/2002 | Shimizu et al. | 360/97.03 |
| 6,449,119 B1 | * | 9/2002 | Hashizume et al. | 360/97.03 |
| 6,545,842 B1 | * | 4/2003 | Rao et al. | 360/244.2 |
| 2002/0196581 A1 | * | 12/2002 | Tsang et al. | 360/97.02 |
| 2003/0058573 A1 | * | 3/2003 | Tadepalli et al. | 360/97.02 |

FOREIGN PATENT DOCUMENTS

| | | |
|---|---|---|
| JP | 58-166537 | 10/1983 |
| JP | 07320478 A * | 12/1995 |

* cited by examiner

*Primary Examiner*—Brian E. Miller
(74) *Attorney, Agent, or Firm*—Greer, Burns & Crain, Ltd.

(57) ABSTRACT

A disk unit for reading information from or writing information to a disk by means of a head supported by an actuator includes a shroud having a face perpendicular to a surface of the disk and opposing a peripheral edge of the disk, and a spoiler having a given height in a direction perpendicular to the surface of the disk and extending above the surface of the disk from the peripheral edge generally toward a center of the disk.

16 Claims, 6 Drawing Sheets

DISK UNIT WITH INCREASED HEAD-POSITIONING ACCURACY

BACKGROUND OF THE INVENTION

1. Field of the Invention

The present invention generally relates to disk units that read information from or write information to a disk medium (hereinafter referred to simply as a disk) by a head moving over the disk medium, and more particularly to a disk unit that increases the positioning accuracy of the head with respect to the disk medium by regulating airflow generated by the rotation of the disk.

Recently, disk units represented by magnetic disk units have been the center of information recording apparatuses. The rapid development and spread of computers in recent years has required disk units to realize larger storage capacity, higher processing speed, lower costs, and downsizing.

A major technical problem in answering these requests is to increase head-positioning accuracy. Factors causing the deterioration of the head-positioning accuracy include both a disturbance synchronous with disk rotation and a disturbance asynchronous with disk rotation. The asynchronous disturbance includes a wind disturbance caused by airflow generated by the mechanical oscillation of a disk unit or by disk rotation.

Lately, the wind disturbance has become an especially major problem. This is mainly due to the following two points. First, a high disk rotation speed for realizing the high-speed operation of a disk unit generates high-speed airflow in the disk unit. Second, with an increase in recording density, head-positioning accuracy has become finer so that airflow has exerted a relatively greater influence.

As described above, the wind disturbance must be reduced to realize the high recording density and high-speed operation of the disk unit.

2. Description of the Related Art

The following two parts are known as means for reducing the wind disturbance employed in a conventional disk unit. The first one is called a shroud. The shroud is a wall having a face perpendicular to a surface of a disk and opposing a part of the peripheral edge of the disk without contact. The shroud regulates airflow generated by disk rotation so that the airflow goes along the face of the shroud, and reduces vibrations generated in a direction other than that of the disk rotation.

The second one is called a spoiler. The spoiler has a given height in a direction perpendicular to the surface of the disk, and extends above the surface of the disk. The spoiler decelerates airflow flowing over the surface of the disk, and regulates the airflow in the extending direction of the spoiler, thus reducing the influence of the wind disturbance on a positioning system.

However, as previously described, the wind disturbance has exerted a greater influence on the head-positioning accuracy lately, thus making it difficult to increase the head-positioning accuracy by individually employing the shroud and spoiler.

SUMMARY OF THE INVENTION

It is a general object of the present invention to provide a disk unit in which the above-described disadvantage is eliminated.

A more specific object of the present invention is to provide a disk unit whose head-positioning accuracy is increased by reducing a wind disturbance generated in a housing of the disk unit.

Another specific object of the present invention is to provide an inexpensive, high-performance disk unit with reduced costs of parts for reducing the wind disturbance.

The above objects of the present invention are achieved by a disk unit for reading information from or writing information to a disk by means of a head supported by an actuator, the disk and the actuator being contained in a housing of the disk unit, which disk unit includes a shroud having a face perpendicular to a surface of the disk and opposing a peripheral edge of the disk, and a spoiler having a given height in a direction perpendicular to the surface of the disk and extending above the surface of the disk from the peripheral edge generally toward a center of the disk.

According to the above-described disk unit, the influence of wind disturbance on a positioning mechanism is reduced due to the multiplier effect of the shroud and the spoiler compared with a case where the shroud or the spoiler is employed individually.

The above objects of the present invention are also achieved by a disk unit for reading information from or writing information to a disk by means of a head supported by an actuator, the disk and the actuator being contained in a housing of the disk unit, which disk unit includes a spoiler having a given height in a direction perpendicular to the surface of the disk and extending above the surface of the disk from the peripheral edge to a center of the disk, the spoiler being provided in proximity to a boundary between a first area where an inner wall of the housing runs side by side with the peripheral edge of the disk and a second area where a distance between the inner wall and the peripheral edge becomes longer than in the first area.

According to the above-described disk unit, the airflow regulated by the inner wall of the housing is decelerated and regulated by the spoiler right before being ejected into the area where the distance between the inner wall and the peripheral edge becomes longer, that is, before being disturbed by being ejected into a larger area. Therefore, the high-speed airflow including a turbulent component is prevented from flowing toward the actuator, thus realizing high head-positioning accuracy.

The above objects of the present invention are also achieved by a disk unit including a disk, an actuator for supporting a head that reads information from or writes information to the disk, a first member for regulating airflow generated by disk rotation so that the airflow flows in a rotational direction of the disk, and a second member for receiving and regulating the airflow regulated by the first member so as to prevent the airflow from flowing toward the actuator.

According to the above-described disk unit, the influence of wind disturbance on a positioning mechanism is reduced due to the multiplier effect of the first and second members compared with a case where the first or second member is employed individually.

The above objects of the present invention are further achieved by a disk unit including a disk, an actuator for supporting a head that reads information from or writes information to the disk, and an airflow-regulating member for receiving and regulating airflow generated by disk rotation so as to prevent the airflow from flowing toward the actuator, the airflow-regulating member being provided in proximity to a boundary between a first area where an inner wall of a housing of the disk runs side by side with a peripheral edge of the disk and a second area where a distance between the inner wall and the peripheral edge becomes longer than in the first area.

According to the above-described disk unit, the airflow regulated by the inner wall of the housing is decelerated and regulated by the airflow-regulating member right before being ejected into the area where the distance between the inner wall and the peripheral edge becomes longer, that is, before being disturbed by being ejected into a larger area. Therefore, the high-speed airflow including a turbulent component is prevented from flowing toward the actuator, thus realizing high head-positioning accuracy.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention. In each embodiment, a magnetic disk unit is employed as a disk unit.

Figure 1:
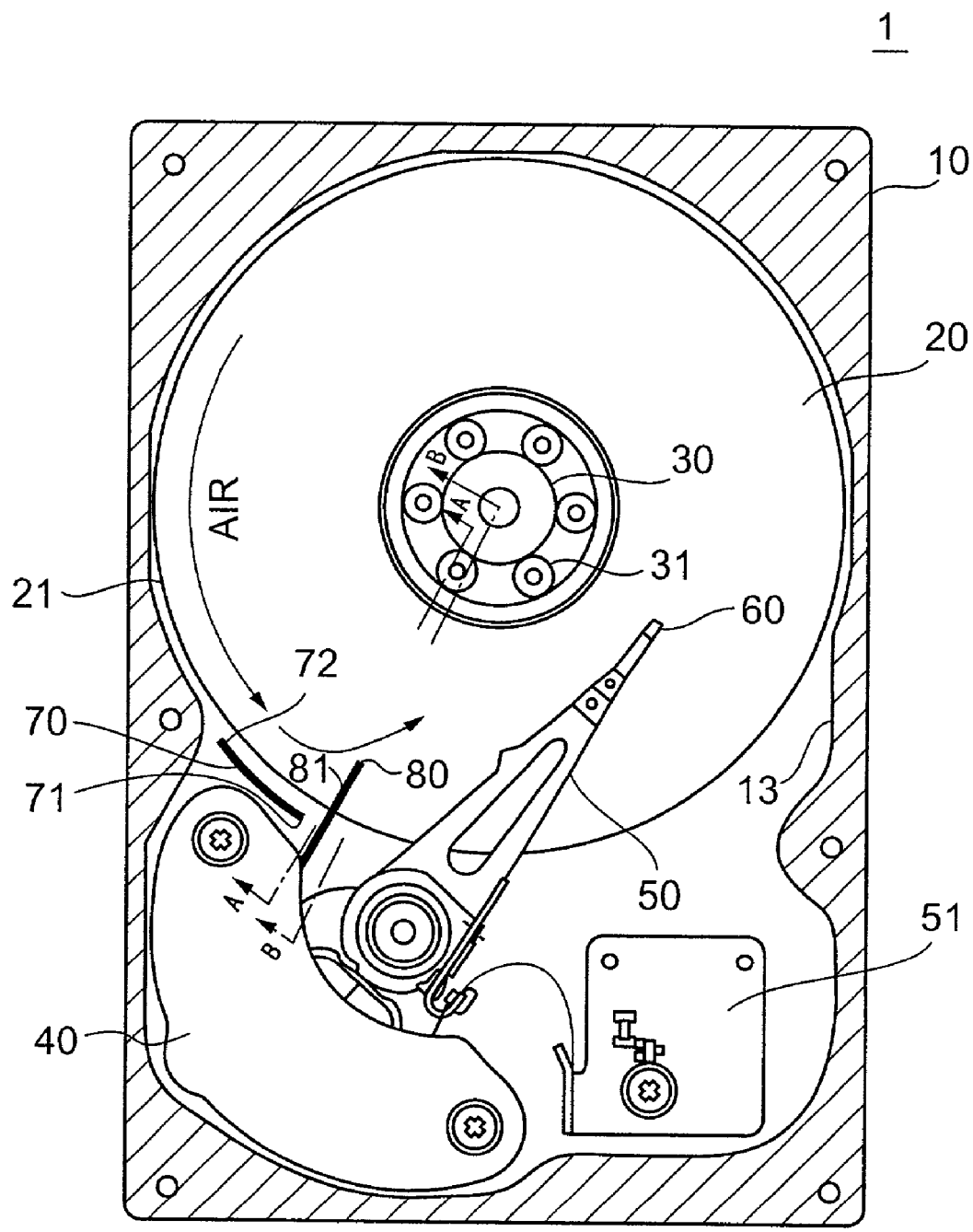
FIG. 1 is a top plan view of a magnetic disk unit according to a first embodiment of the present invention.

FIG. 1 is a top plan view of a magnetic disk unit 1 without a cover 11 according to a first embodiment of the present invention. Although the magnetic disk unit 1 employed in this embodiment is of a 3.5-inch type, the present invention is applicable to other types of disk units. Further, two magnetic disks 20 are loaded in layers in the magnetic disk unit 1, but only one of the two is shown as the magnetic disk 20 in FIG. 1. The number of the magnetic disks 20 is not limited to two, but may be one or more than two.

In FIG. 1, the magnetic disk unit 1 includes a base 10 that forms a housing of the magnetic disk unit 1. Mounted on the base 10 are a spindle motor 30 that rotates the magnetic disk 20, an actuator 50 that supports a magnetic head 60, and a magnetic circuit 40 that moves the actuator 50 in the radial direction of the magnetic disk 20. The magnetic disk 20 is fixed to the spindle motor 30 by screws 31, and rotates counterclockwise in this embodiment. The magnetic head 60 is positioned in a given position on the recording surface of the magnetic disk 20 by the actuator 50, and reads information from or writes information to the magnetic disk 20. A flexible printed circuit (FPC) 51 connects the housing and a control circuit (not shown) provided outside the housing to transmit a driving current to the actuator 50, a readout signal from the magnetic head 60, and a write signal to the magnetic head 60.

As shown in FIG. 1, the major part of a peripheral edge 21 of the magnetic disk 20 is surrounded by an inner wall 13 of the base 10 in close proximity thereto. However, since a space for mounting the actuator 50 and the magnetic circuit 40 is secured in the base 10, it is impossible to have all the peripheral edge of the magnetic disk 20 in close proximity to the inner wall 13 of the base 10. With the inner wall 13 of the base 10 being in close proximity to the peripheral edge of the magnetic disk 20, airflow generated by the rotation of the magnetic disk 20 can be regulated. On the other hand, the magnetic disk 20 is away from the inner wall 13 of the base 10 around the actuator 50. Thereby, the disturbance of airflow generated by the rotation of the magnetic disk 20 is caused around the actuator 50, thus vibrating the actuator 50. Consequently, the positioning accuracy of the magnetic head 60 is decreased, thus making it difficult to realize high-density recording and a high processing speed.

Therefore, in the present invention, a shroud 70 and a spoiler 80 are provided in a space between the peripheral edge of the magnetic disk 20, and the actuator 50 or the magnetic circuit 40.

The shroud 70 has a wall surface 72 that is perpendicular to the surface of the magnetic disk 20 and separated in the radial direction from the peripheral edge of the magnetic disk 20. The shroud 70 regulates airflow flowing over the surface of the magnetic disk 20 so that the airflow goes along the wall surface 72 of the shroud 70.

The spoiler 80 has a given height in a direction perpendicular to the surface of the magnetic disk 20, and extends above the surface of the magnetic disk 20 from its peripheral edge generally toward its center. The spoiler 80 receives and decelerates the airflow flowing over the surface of the magnetic disk 20, and regulates the airflow so that the airflow flows in the extending direction of the spoiler 80.

In this embodiment, the shroud 70 is provided in a direction reverse to the rotational direction (a counter-rotational direction) of the magnetic disk 20 from the spoiler 80, or in the upstream of the spoiler 80 with respect to the rotational direction of the magnetic disk 20. In FIG. 1, a distance between a downstream end 71 of the shroud 70 and an air-receiving surface 81 of the spoiler 80 is supposed to be 5 mm, but the distance may be shorter. In a structure shown in FIG. 1, the magnetic disk 20 rotates counterclockwise so that the airflow generated by the rotation of the magnetic disk 20 also flows counterclockwise. The airflow is regulated by the shroud 70 to go along the wall surface 72 of the shroud 70, or to go along the circumference of the magnetic disk 20, and runs into the spoiler 80. The spoiler 80 receives the airflow regulated by the shroud 70 on the air-receiving surface 81 to decelerate the airflow, and changes the direction of the airflow to the extending direction of the spoiler 80, or the radial direction of the magnetic disk 20. Thereby, the collision of the airflow with the actuator 50 is softened.

In FIG. 1, the base 10 includes a four-sided wall part and a part of the inner surface of the wall part, or a part of the inner wall 13, surrounds the major part of the peripheral edge 21 of the magnetic disk 20. However, the base 10 may be flat in shape. In such a case, the cover 11 is provided with a four-sided wall part and a part of the inner surface of the wall part surrounds the peripheral edge 21 of the magnetic disk 20.

Figure 2A:
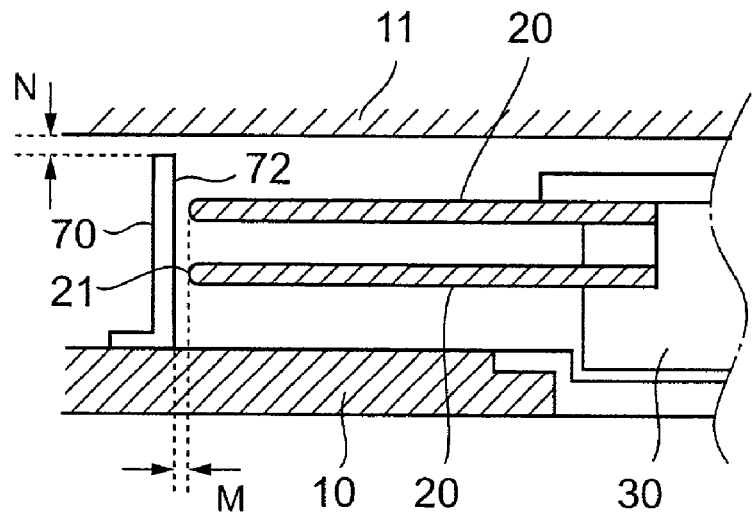
FIGS. 2A and 2B are sectional views of the magnetic disk unit of FIG. 1 taken along the lines A—A and B—B, respectively.
Figure 2B:
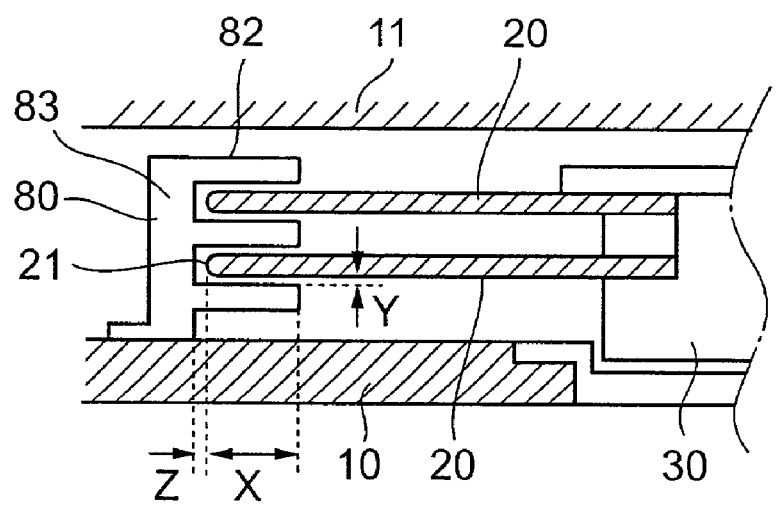

FIGS. 2A and 2B are sectional views of the magnetic disk unit 1 of FIG. 1 taken along the lines A—A and B—B, respectively.

As shown in FIG. 2A, the two magnetic disks 20 are attached one over the other to the spindle motor 30, and the shroud 70 stands straight up from the bottom surface of the base 10 toward the cover 11. A distance M between the wall surface 72 of the shroud 70 and the peripheral edge 21 of each magnetic disk 20 preferably satisfies a condition 0.1 mm≦M≦5 mm. This distance M is almost equal to a distance between the inner wall 13 of the base 10 and the peripheral edge 21 of each magnetic disk 20. Here, the wall surface 72 of the shroud 70 has such a curvature as to curve along each peripheral edge 21, but the wall surface 72 may be flat. A distance N between the top of the shroud 70 and the cover 11 preferably satisfies a condition 0 mm<N≦5 mm. The height of the shroud 70 depends on a distance between the base 10 and the cover 11.

Although the shroud 70 is fixed to the base 10 in FIG. 2A, the shroud 70 may be fixed to the cover 11. The shroud 70 may be formed separately from or integrally with the base 10 or the cover 11. In the case of forming the shroud 70 separately from the base 10 or the cover 11, the shroud 70 is preferably formed of a metal such as stainless steel or aluminum alloy, or of a resin material such as polycarbonate.

In FIG. 2B, the spoiler 80 includes an upright part 83 perpendicular to each magnetic disk 20 and three teeth 82 each extending from the upright part 83 toward the center of each magnetic disk 20. Consequently, the spoiler 80 has side faces each shaped like a comb. The number of the teeth 82 depends on the number of the magnetic disks 20. A distance Y between the surface of each magnetic disk 20 and the opposing tooth 82 preferably satisfies a condition 0 mm<Y≦2 mm. Therefore, the height, or the vertical length, of the tooth 82 inserted into the two magnetic disks 20 depends on a distance between the two magnetic disks 20. The longer a distance X between the peripheral edge 21 of each magnetic disk 20 and the end of each tooth 82, the greater airflow deceleration and regulation effects. However, this results in greater power consumption. In this embodiment, the distance X is preferably set to satisfy a condition 1 mm≦X≦20 mm. A distance Z between the base of each tooth 82 and the peripheral edge 21 of each magnetic disk 20 preferably satisfies a condition 0 <Z≦5 mm.

In FIG. 2B, each tooth 82 of the spoiler 80 is shaped like a plate to have faces perpendicular to the surface of each magnetic disk 20, so that the air-receiving surface 81 is flat. However, the shape of each tooth 82 is not limited to this, but may be cylindrical so that the air-receiving surface 81 is curved. Further, although the spoiler 80 is fixed to the base 10, the spoiler 80 may be fixed to the cover 11. Furthermore, the spoiler 80 may be formed separately from or integrally with the base 10 or the cover 11. In the case of forming the spoiler 80 separately from the base 10 or the cover 11, the spoiler 80 is preferably formed of a metal such as stainless steel or aluminum alloy, or of a resin material such as polycarbonate.

Figure 3:
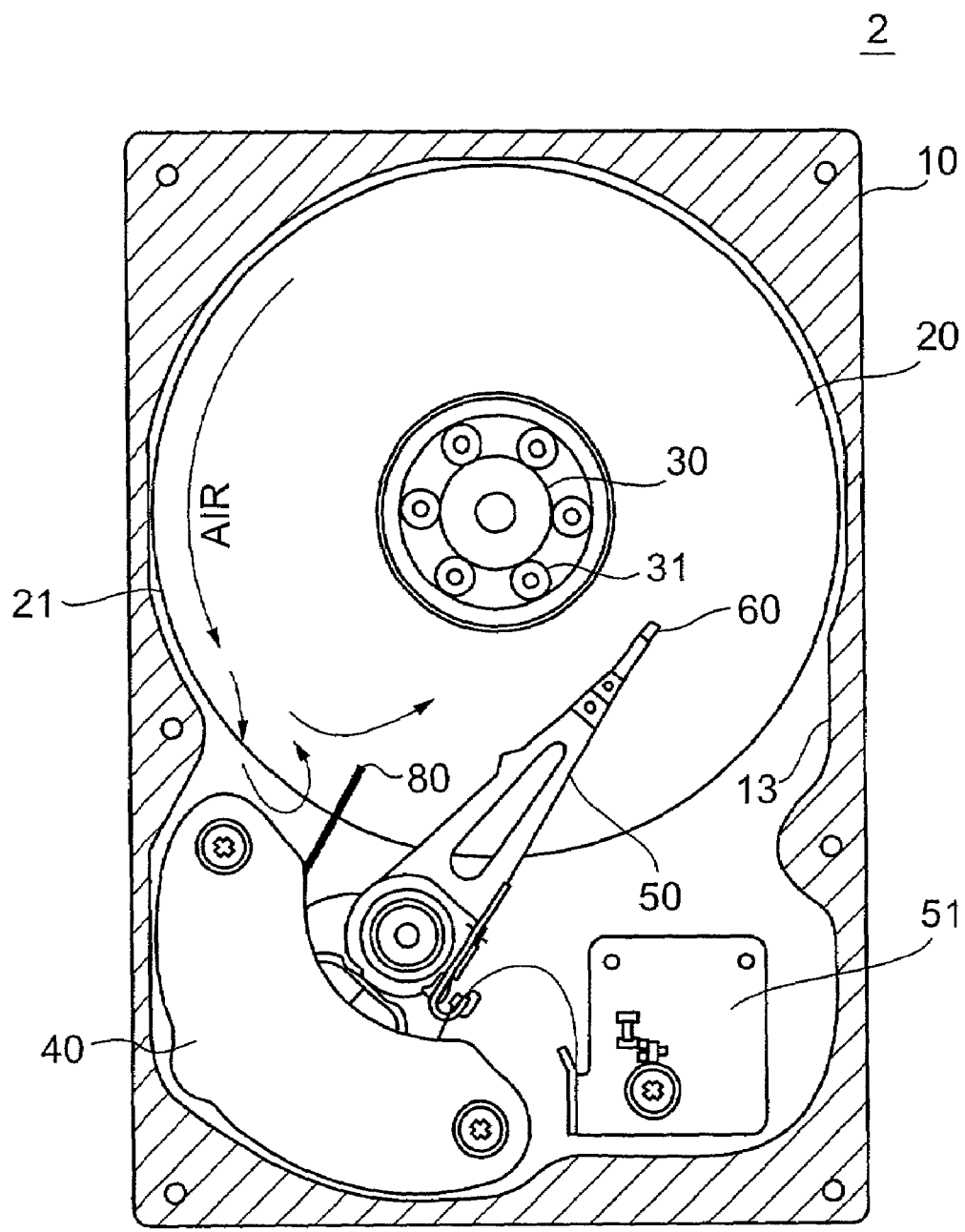
FIG. 3 is a top plan view of a magnetic disk unit without a shroud.

Next, a description will be given of a comparison made between the magnetic disk unit 1 shown in FIG. 1 and a magnetic disk unit 2 shown in FIG. 3 on the airflow deceleration and regulation effects to verify a multiplier effect produced by employing the shroud 70 and the spoiler 80 at the same time. The magnetic disk unit 2 of FIG. 3 includes the spoiler 80, but is not provided with the shroud 70. In FIG. 3, the same elements as those of FIG. 1 are referred to by the same numerals, and a description thereof will be omitted.

In the magnetic disk unit 1 of FIG. 1, the airflow is generated in a direction indicated by arrows in FIG. 1 during the rotation of the magnetic disk 20. The airflow flows along the inner wall 13 of the base 10 in the proximity thereof. When the airflow runs into the shroud 70, the airflow is regulated to flow along the shroud 70 toward the spoiler 80. Then, the airflow runs into the spoiler 80 in its regulated state by the spoiler 80. After running into the spoiler 80, the airflow is received by the air-receiving surface 81 to be decelerated, and is regulated in the extending direction of the spoiler 80. Therefore, the collision of the airflow with the actuator 50 is softened so that the influence of the wind disturbance on the actuator 50 is reduced.

On the other hand, in the magnetic disk unit 2 of FIG. 3, the spoiler 80 is provided where the peripheral edge 21 of the magnetic disk 20 and the inner wall 13 of the base 10 are widely separated. According to this structure, airflow comes out from a confined space to a large space between the peripheral edge 21 of the magnetic disk 20 and the inner wall 13 of the base 10 so as to be dispersed in various directions before reaching the spoiler 80. Since the airflow running into the spoiler 80 includes a turbulent component, the spoiler 80 is prevented from sufficiently decelerating and regulating the airflow. As a result, the high-speed airflow containing the turbulent component runs into and vibrates the actuator 50, thus causing a decrease in the head-positioning accuracy.

Next, a description will be given of a comparison between each of the magnetic disk units 1 and 2 and a magnetic disk unit with neither shroud nor spoiler on a non-repeatable position error (NRPE), that is, the swing margin of the positioning mechanism resulting from the asynchronous disturbance (disturbance asynchronous with disk rotation) of the whole magnetic disk unit. These comparisons were made to verify a specific airflow regulation effect by studying a decrease in the NRPE.

The NRPE decreased by 2.5% in the magnetic disk unit 2 of FIG. 3 compared with the magnetic disk unit with neither shroud nor spoiler. On the other hand, the NRPE decreased by 15% in the magnetic disk unit 1 of FIG. 1. The NRPE is influenced by other factors than the wind disturbance. That is, these results indicate that, in the present invention, a wind disturbance reduction effect is more than sextupled by employing both shroud 70 and spoiler 80 at the same time compared with a case where only a spoiler is employed.

Figure 4:
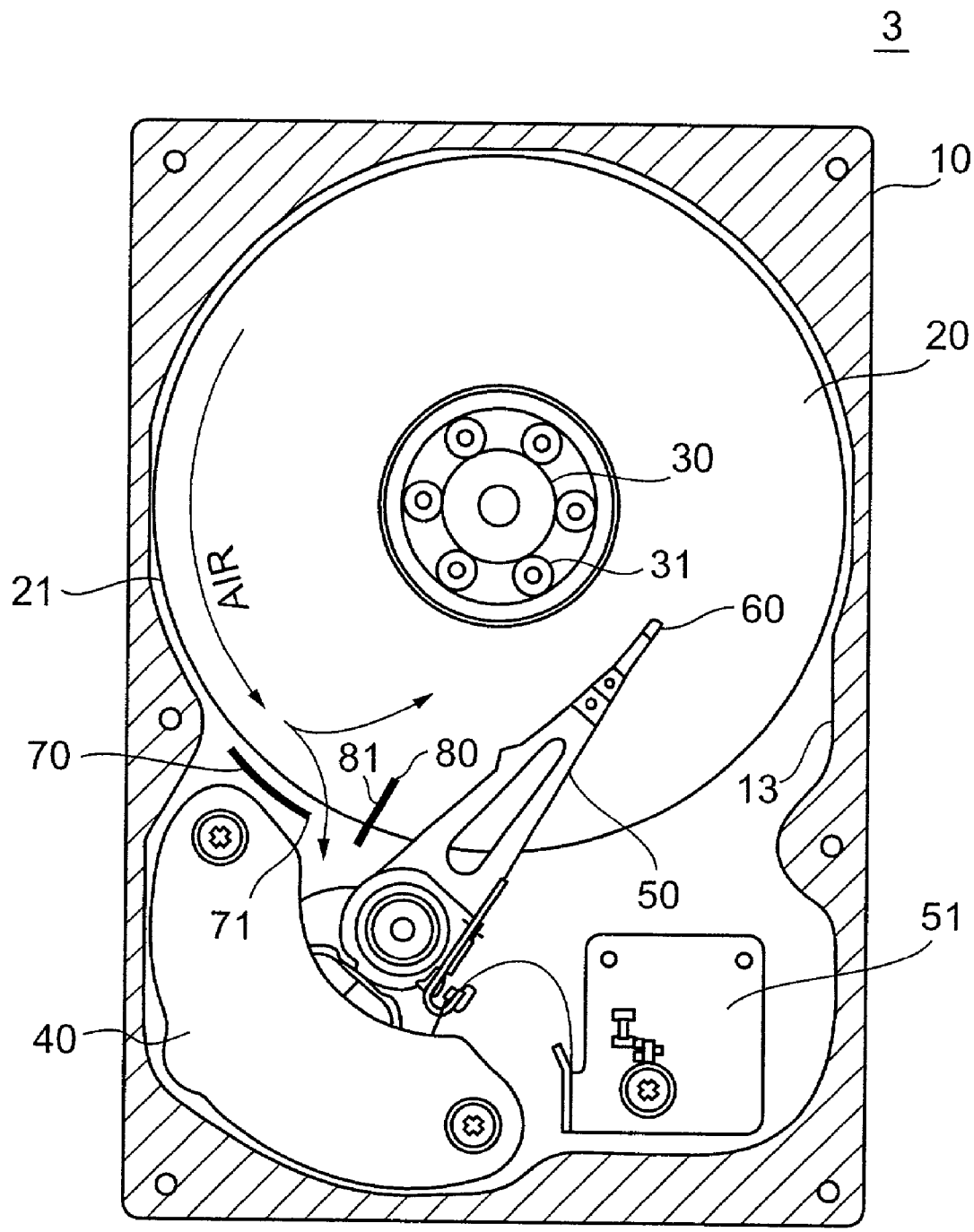
FIG. 4 is a top plan view of a magnetic disk unit in which the shroud and the spoiler are separated by a distance of over 5 mm.

Next, a description will be given of the results of the verification of the airflow regulation effect of each of the magnetic disk unit 1 of FIG. 1 and a magnetic disk unit 3 of FIG. 4. The verifications were made to clarify a relation between the airflow regulation effect and the positions of the shroud 70 and the spoiler 80. In FIG. 4, the same elements as those of FIG. 1 are referred to by the same numerals, and a description thereof will be omitted.

In the magnetic disk unit 3 of FIG. 4, both shroud 70 and spoiler 80 are provided, but the downstream end 71 of the shroud 70 and the air-receiving surface 81 of the spoiler 80 are separated by a distance of over 5 mm, which distance is longer than that in the magnetic disk unit 1. In the magnetic disk unit 3, airflow is regulated by the shroud 70, but is dispersed in various directions as indicated by arrows in FIG. 4 after passing by the downstream end 71 of the shroud 70. Since the airflow running into the spoiler 80 includes a turbulent component, the spoiler 80 is prevented from sufficiently decelerating and regulating the airflow. As a result, the high-speed airflow containing the turbulent component runs into and vibrates the actuator 50, thus causing a decrease in the head-positioning accuracy. From these verification results, it is concluded that the distance between the downstream end 71 of the shroud 70 and the air-receiving surface 81 of the spoiler 80 is preferably less than or equal to 5 mm.

Figure 5:
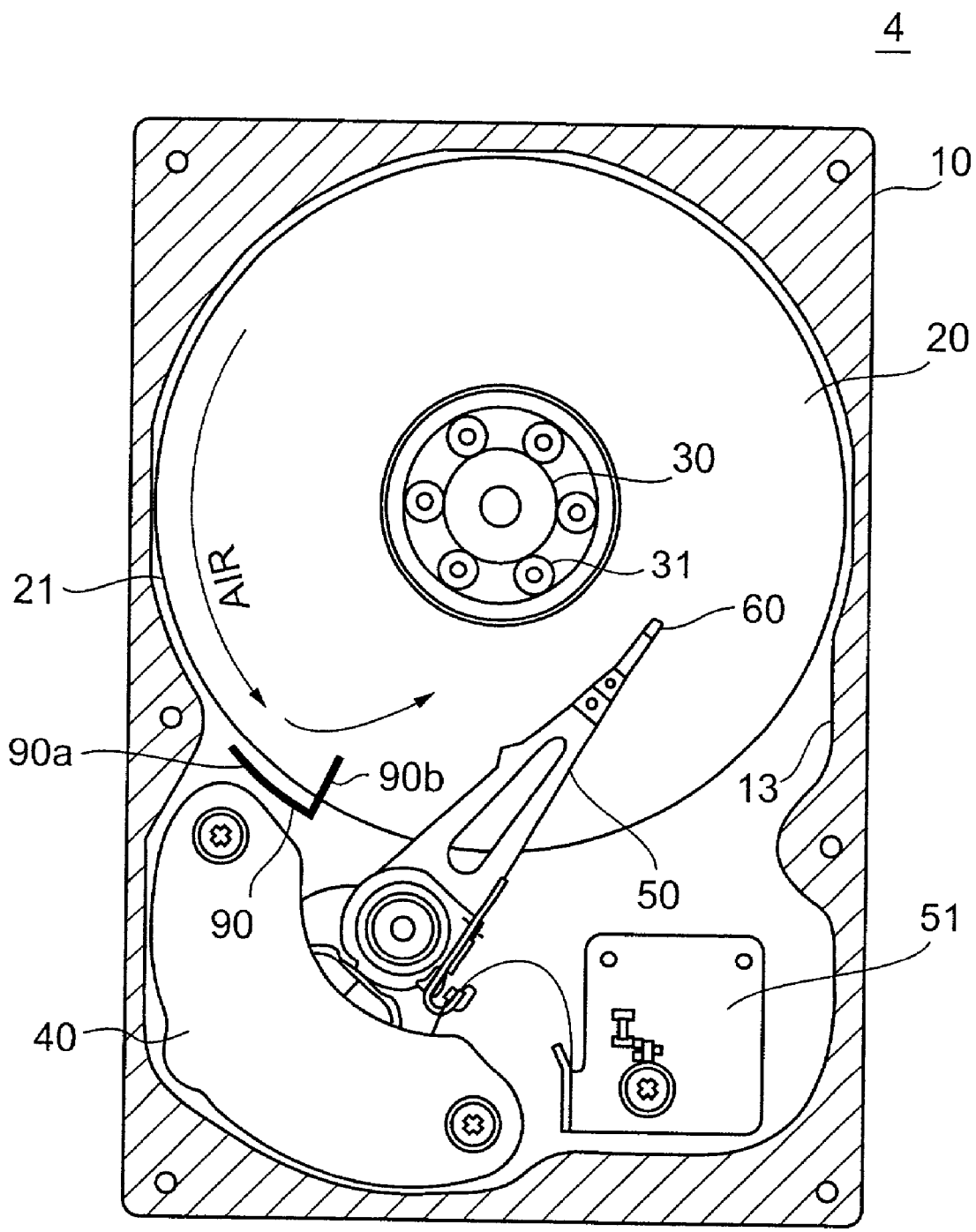
FIG. 5 is a top plan view of a magnetic disk unit having the shroud and the spoiler formed integrally with each other.

FIG. 5 is a top plan view of a magnetic disk unit 4, which is a variation of the magnetic disk unit 1 of FIG. 1. In FIG. 5, the same elements as those of FIG. 1 are referred to by the same numerals, and a description thereof will be omitted.

In the magnetic disk unit 4, a shroud and a spoiler are integrated into an integrated member 90. The integrated member 90 includes a shroud part 90a and a spoiler part 90b. Although integrated, the shroud part 90a and the spoiler part 90b have the same dimensions and positional relation to the magnetic disk 20 as those of the shroud 70 and the spoiler 80 shown in FIG. 1. According to this structure, costs can be reduced with a reduced number of parts. Further, since there is no distance between the downstream end of the shroud part 90a and the air-receiving surface of the spoiler part 90b, which is an ideal structure conformable to the above-described verification results, the multiplier effect of the shroud and spoiler can be maximized.

The integrated member 90 may be fixed to the base 10 or the cover 11. The integrated member 90 may be formed separately from or integrally with the base 10 or the cover 11. In the case of forming the integrated member 90 separately from the base 10 or the cover 11, the same material as that of the shroud 70 or the spoiler 80 shown in FIG. 1 can be used for the integrated member 90.

Figure 6:
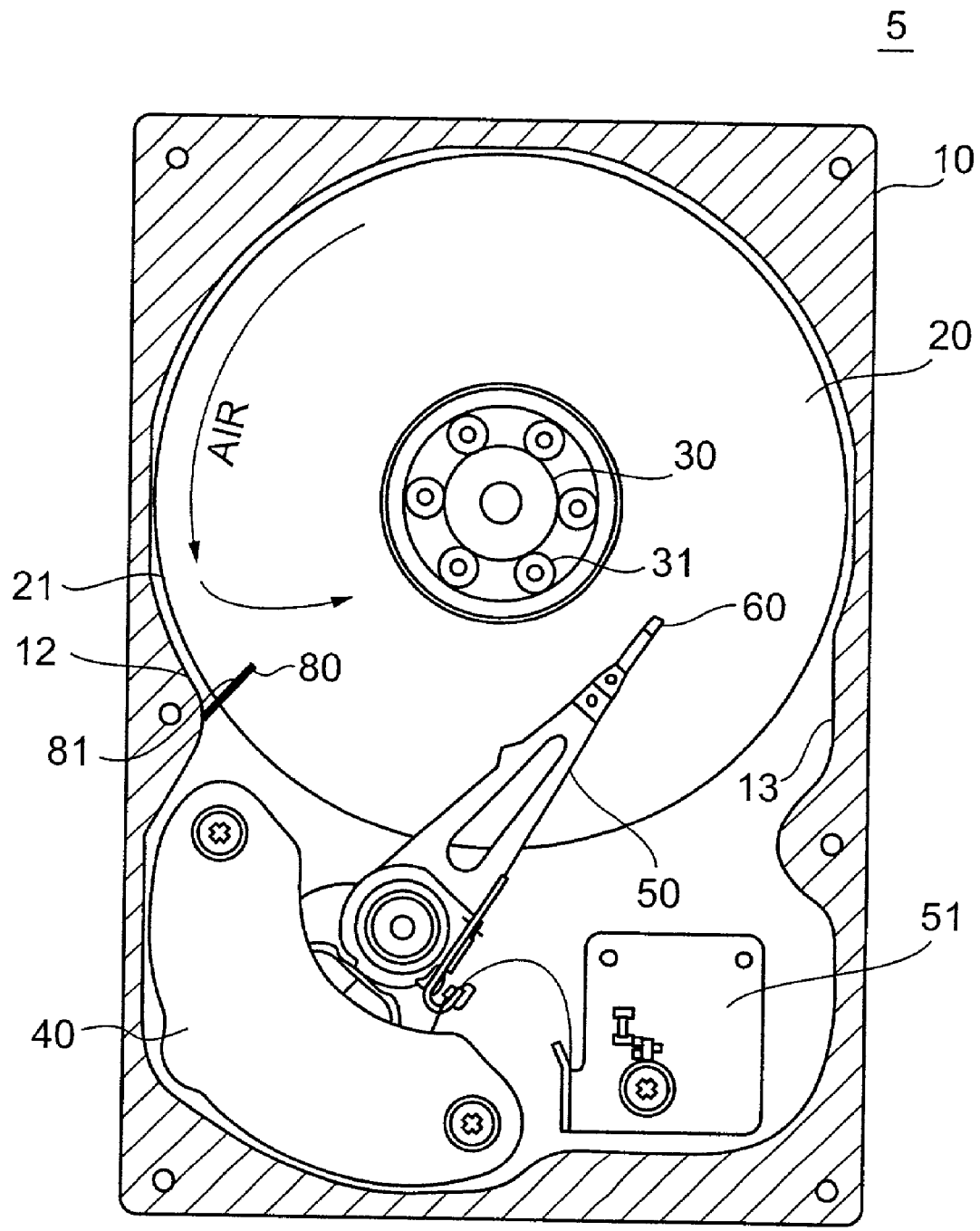
FIG. 6 is a top plan view of a magnetic disk unit according to a second embodiment of the present invention.

FIG. 6 is a top plan view of a magnetic disk unit 5 according to a second embodiment of the present invention. The same elements as those of FIG. 1 are referred to by the same numerals, and a description thereof will be omitted.

In the magnetic disk unit 5 of FIG. 6, a shroud is not provided, but the spoiler 80 is provided in close proximity to a boundary 12 between an area where the inner wall 13 of the base 10 runs side by side with the peripheral edge 21 of the magnetic disk 20 and an area where the inner wall 13 moves away from the peripheral edge 21. The air-receiving surface 81 of the spoiler 80 is positioned preferably within the range of 5 mm from the boundary 12 in its downstream, or in the rotational direction of the magnetic disk 20.

The magnetic disk unit 5 of FIG. 6 is equal to the magnetic disk unit 2 of FIG. 3 in not including a shroud. However, the spoiler 80 of this embodiment is positioned further upstream than that in the magnetic disk 2 of FIG. 3. According to this structure, airflow regulated by the inner wall 13 of the base 10 is decelerated and regulated by the spoiler 80 before being ejected and dispersed into a larger space. Therefore, the collision of the airflow with the actuator 50 is softened so that the head-positioning accuracy can be increased. According to this embodiment, an improvement in the airflow regulation effect can be expected, and at the same time, the number of parts can be reduced since no shroud is necessary.

In FIG. 6, the base 10 includes a four-sided wall part and a part of the inner surface of the wall part, or a part of the inner wall 13, surrounds the major part of the peripheral edge 21 of the magnetic disk 20. However, the base 10 may be flat in shape. In such a case, the cover 11 is provided with a four-sided wall part and a part of the inner surface of the wall part surrounds the peripheral edge 21 of the magnetic disk 20.

The spoiler 80 of this embodiment has side faces each having a shape almost equal to that of the spoiler 80 shown in FIG. 2B. However, it is preferable that the spoiler 80 of this embodiment be joined to the inner wall 13 surrounding the magnetic disk 20. The spoiler 80 may be fixed to the base 10 or the cover 11. The spoiler 80 may be formed separately from or integrally with the base 10 or the cover 11. In the case of forming the spoiler 80 separately from the base 10 or the cover 11, the spoiler 80 is preferably formed of a metal such as stainless steel or aluminum alloy, or of a resin material such as polycarbonate.

The present invention is not limited to the specifically disclosed embodiments, but variations and modifications may be made without departing from the scope of the present invention.

The present application is based on Japanese priority patent application No. 2000-376542 filed on Dec. 11, 2000, the entire contents of which are hereby incorporated by reference.

What is claimed is:

1. A disk unit for reading information from or writing information to a disk by means of a head supported by an actuator, the disk and the actuator being contained in a housing of the disk unit, the disk unit comprising:
    a shroud having a face perpendicular to a surface of the disk and opposing a peripheral edge of the disk; and
    a spoiler having a given height in a direction perpendicular to the surface of the disk and extending above the surface of the disk from the peripheral edge generally toward a center of the disk,
    wherein said shroud has an end in the rotational direction of the disk, the end being separated from a surface of said spoiler by a spacing of 5 mm or less, the surface receiving airflow generated by disk rotation.

2. The disk unit as claimed in claim 1, wherein said shroud and said spoiler are provided in a counter-rotational direction of the disk from the actuator.

3. The disk unit as claimed in claim 2, wherein said shroud is provided in the counter-rotational direction of the disk from said spoiler.

4. The disk unit as claimed in claim 1, wherein the face of said shroud is curved along the peripheral edge of the disk.

5. The disk unit as claimed in claim 1, wherein the face of said shroud is flat.

6. A disk unit comprising:
    a disk;
    an actuator for supporting a head that reads information from or writes information to the disk;
    a first member for regulating airflow generated by disk rotation so that the airflow flows in a rotational direction of the disk; and
    a second member for receiving and regulating the airflow regulated by said first member so as to prevent the airflow from flowing toward the actuator,
    wherein said first member has an end in the rotational direction of the disk, the end being separated from a surface of said second member by a spacing of 5 mm or less, the surface receiving airflow generated by disk rotation.

7. The disk unit as claimed in claim 6, wherein said first and second members are provided in a counter-rotational direction of the disk from the actuator.

8. The disk unit as claimed in claim 7, wherein said first member is provided in the counter-rotational direction of the disk from said second member.

9. The disk unit as claimed in claim 6, wherein the airflow is regulated by said second member to flow in a radial direction of the disk.

10. The disk unit as claimed in claim 6, wherein said first member is a shroud and said second member is a spoiler.

11. A disk unit for reading information from or writing information to a disk by means of a head supported by an actuator, the disk and the actuator being contained in a housing of the disk unit, the disk unit comprising:

a shroud having a face perpendicular to a surface of the disk and opposing a peripheral edge of the disk; and a spoiler having a given height in a direction perpendicular to the surface of the disk and extending above the surface of the disk from the peripheral edge to a center of the disk, wherein the spoiler includes an upright part extending in the direction perpendicular to the surface of the disk, and includes at least one tooth extending from the upright part toward the center of the disk and having a length between 1 mm and 25 mm, wherein said shroud has an end in the rotational direction of the disk, the end being separated from a surface of said spoiler by a spacing of 5 mm or less, the surface receiving airflow generated by disk rotation.

12. A disk unit comprising:

a disk;

an actuator for supporting a head that reads information from or writes information to the disk;

a first member for regulating airflow generated by disk rotation so that the airflow flows in a rotational direction of the disk; and a second member for receiving and regulating the airflow regulated by said first member so as to prevent the airflow from flowing toward the actuator, wherein the second member includes an upright part extending in a direction perpendicular to a surface of the disk, and includes at least one tooth extending from the upright part toward a center of the disk and having a length between 1 mm and 25 mm, wherein said first member has an end in the rotational direction of the disk, the end being separated from a surface of said second member by a spacing of 5 mm or less, the surface receiving airflow generated by disk rotation.

13. A disk unit for reading information from or writing information to a disk by means of a head supported by an actuator, the disk and the actuator being contained in a housing of the disk unit, the disk unit comprising:

a shroud having a face perpendicular to a surface of the disk and opposing a peripheral edge of the disk; and a spoiler having a given height in a direction perpendicular to the surface of the disk and extending above the surface of the disk from the peripheral edge to a center of the disk, wherein the spoiler is formed of a metal or resin material, and wherein said shroud has an end in the rotational direction of the disk, the end being separated from a surface of said spoiler by a spacing of 5 mm or less, the surface receiving airflow generated by disk rotation.

14. The disk unit as claimed in claim 13, wherein the material of the spoiler is selected from stainless steel, aluminum alloy, and polycarbonate.

15. A disk unit comprising:

a disk;

an actuator for supporting a head that reads information from or writes information to the disk;

a first member for regulating airflow generated by disk rotation so that the airflow flows in a rotational direction of the disk; and a second member for receiving and regulating the airflow regulated by said first member so as to prevent the airflow from flowing toward the actuator, wherein the second member is formed of a metal or resin material, and wherein said first member has an end in the rotational direction of the disk, the end being separated from a surface of said second member by a spacing of 5 mm or less, the surface receiving airflow generated by disk rotation.

16. The disk unit as claimed in claim 15, wherein the material of the spoiler is selected from stainless steel, aluminum alloy, and polycarbonate.

* * * * *